Patented Aug. 8, 1950

2,518,023

UNITED STATES PATENT OFFICE 2,518,023

AZO DYESTUFFS

Ernst Keller and Fritz Probst, Basel, Switzerland, assignors to J. R. Geigy A. G., Basel, Switzerland No Drawing. Application October 23, 1947, Serial No. 781,748. In Switzerland October 31, 1946

7 Claims. (Cl. 260—175)

This invention produces valuable new azo dyestuffs.

Such azo dyestuffs can be obtained by submitting 2 molecular proportions of an aminoazo dyestuff of the general formula:

$R_1—N=N—R_2—NH_2$ wherein $R_1$ means the radical of an O-acyl-1-amino-8-hydroxy-naphthalene-3:6-disulphonic acid and $R_2$ means the radical of a primary aromatic amine coupling in the p-position to the amino group together with 1 molecular proportion of a mono- or polynuclear aromatic compound containing two primary amino groups, not in the o-position relative to one another, e. g. an aromatic mono- or polynuclear diamine capable of being di-acylated, and when necessary, further containing in particular water-solubilizing groups, to the action of phosgene until the amino groups are completely transformed and subsequently splitting off the acyl radicals from the O-acyl groups.

As diazo components from the group of O-acyl derivatives of 1-amino-8-hydroxynaphthalene-3:6-, or -4:6-disulphonic acids are used the O-benzene-sulpho- and especially the O-p-toluene-sulpho-1-amino - 8 - hydroxynaphthalene-3:6- or -4:6-disulphonic acids. The most satisfactory coupling components are: 1-amino-3-methyl-6-methoxy- and -6-ethoxy-benzene. Out of the large number of mono- or polynuclear diamines the following are those mainly used: p-phenylenediamine, m-phenylenediamine, p-phenylene-diamine-sulphonic acid, p-phenylene-diamine-carboxylic acid, m - phenylenediamine-sulphonic acid, benzidine, o-toluidine, o-dianisidine, benzidine-2:2'-disulphonic acid, benzidine-3:3'-disulphonic acid, benzidine-3-sulphonic acid, 4:4'-diamino-diphenylurea-3:3'-disulphonic acid, 4:4'-diamino-diphenylurea-2:2'-disulphonic acid, 1-methyl-2:6-diaminobenzene-4-sulphonic acid, 4'-aminobenzoyl-p-phenylene - diamine _ sulphonic acid, 3'-aminocinnamoyl-p-phenylenediamine-sulphonic acid, 4:4'-diaminostilbene, 4:4'-diaminostilbene-2:2'-disulphonic acid, 4-amino-4'-(p - aminobenzoyl) - aminostilbene - 2:2'-disulphonic acid, 4 - amino-4'-(m-amino-benzoyl)-aminostilbene-2:2'-disulphonic acid, 4:4'-di-(p-aminobenzoyl) - diamino - stilbene - 2:2' - disulphonic acid, 4:4'-diaminodiphenylmethane, 1:5-diaminonaphthalene-3:7-disulphonic acid, 2:6-diaminonaphthalene-8-sulphonic acid, 6:6'-diamino - 2:2'-dinaphthylurea - 8:8'-disulphonic acid, 2:7 - diaminonaphthalene, 1:5-di-(p-aminobenzoylamino)-naphthalene - 3:7 - disulphonic acid, 1:5 - di - (m-aminobenzoylamino)-naphthalene-3:7-disulphonic acid.

The new dyestuffs are dark powders giving a red solution in water and dyeing cellulose fibres in valuable clear red tints distinguished by good light-fastness and also good fastness properties when wet.

Dyestuffs have already been described which are preparable by stepwise condensation of 2 molecular proportions of an amino-azo dyestuff produced by coupling the diazotised O-p-toluene-sulphonic acid ester of 1-amino-8-hydroxynaphthalene-3:6-disulphonic acid with 1-amino-3-methyl-6-methoxy-benzene, with 2 molecular proportions of cyanuric chloride and 1 molecular proportion of either 4:4'-diaminostilbene-2:2'-disulphonic acid or 4:4'-diaminostilbene. It is further possible to replace the third halogen atom by an amine radical. It is true that the reaction leading to the manufacture of the above mentioned dyestuffs has been known for a long time, i. e., the stepwise replacement of the three halogen atoms of a cyanuric halide by amines by a suitable choice of reaction temperature. However, it is new and very surprising to find that 2 molecular proportions of one of the azo dyestuffs claimed in the invention form symmetrical di-urea derivatives with phosgene and one molecular proportion of a primary diamine, whose amino groups are not in the o-position relative to one another.

These new dyestuffs clearly have the following general formula:

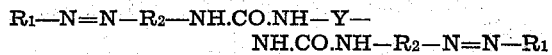

$R_1—N=N—R_2—NH.CO.NH—Y—$
$\quad\quad\quad\quad\quad\quad NH.CO.NH—R_2—N=N—R_1$ where Y means the radical of a diamine as hereinbefore defined.

As compared with the dyestuffs mentioned above, the red shades produced by the new dyestuffs are less yellowish. In addition they exhibit better drawing properties and, in general, better fastness to washing and to water. Furthermore, a considerable number of them have better fastness properties towards acids and alkalis. Another valuable property possessed by the new dyestuffs is that dyeings yielded by them on cellulose fibres alter in shade very little, if at all, when after-treated with compounds used to improve water-fastness properties. It is well known that anti-creasing treatment of woven textiles is of ever-increasing importance in the improvement of such materials. There are only comparatively few direct dyestuffs, however which are not noticeably changed in shade or light-fastness by this treatment. The dyestuffs preparable according to the invention are distinguished in that very little change in shade, in particular, and in fastness to light in general is brought about by the above-mentioned treatment. This is all the more valuable since this property has so far hardly been known among the red, direct-dyeing dyestuffs.

The following examples serve further to explain and expound the invention without, however, limiting it: Parts by weight are in kilograms and their relation to parts by volume is that of kilograms to litres. Temperatures are in degrees centigrade.

Example 1

62.1 parts of the monoazo dyestuff, prepared in the usual way by diazotising the p-toluene-sulphonic acid ester of 1-amino-8-hydroxy-naphthalene-3:6-disulphonic acid and coupling the diazo compound with 1-amino-3-methyl-6-methoxybenzene are dissolved together with 18.5 parts of 4:4'-diaminostilbene-2:2'-disulphonic acid in about 800 parts of water by the addition of sodium carbonate.

Phosgene is passed into the solution, which should be neutral or slightly alkaline (up to the alkalinity of bicarbonate)—in this case with advantage in the presence of sodium acetate—until no more primary amine can be detected in a test-sample. The condensation product is precipitated out with common salt and filtered off.

In order to split off the p-toluene-sulphonic acid group, the dyestuff is heated in dilute caustic alkali solution at 80–90° until complete saponification of the p-toluene-sulphonic acid ester. The saponified dyestuff, which partly crystallises out on cooling, is completely precipitated by the addition of common salt, filtered off and dried.

It dyes cellulose fibres to give clear red shades which have very good fastness properties towards light, washing and water.

Example 2

62.1 parts of the monoazo dyestuff from the diazotised p-toluene-sulphonic acid ester of 1-amino-8-hydroxy-naphthalene-3:6-disulphonic acid and 1-amino-3-methyl-6-methoxybenzene are dissolved together with 13.2 parts of benzidine-3-sulphonic acid in about 750 parts of water by the addition of sodium carbonate.

Treatment with phosgene is then continued as described in the previous example until no more diazotisable amine can be detected in a test-sample.

After splitting off the p-toluene-sulphonic acid group by warming, the dyestuff obtained in the condensation with phosgene in dilute caustic alkali solution at 80–90°, a dyestuff is obtained which dyes cellulose fibres in clear red tones, possessing good fastness properties towards light, water and washing.

Example 3

62.1 parts of the monoazo dyestuff from the diazotised p-toluene-sulphonic acid ester of 1-amino-8-hydroxy-naphthalene-3:6-disulphonic acid and 1-amino-3-methyl-6-methoxybenzene are dissolved together with 7.6 parts of p-phenylene-diamine-carboxylic acid in about 1600 parts of water. Condensation with phosgene and treatment with caustic alkali is then carried out as described in Example 1. After splitting off the p-toluene-sulphonic acid group, a dyestuff is obtained which dyes cellulose fibres in clear, red tones. It, too, has good fastness properties towards light, washing and water.

Example 4

62.1 parts of the monoazo dyestuff from the diazotised p-toluene-sulphonic acid ester of 1-amino-8-hydroxynaphthalene-3:6-disulphonic acid and 1-amino-3-methyl-6-methoxybenzene are dissolved in about 1200 parts of water by adding sodium carbonate and made slightly acid to litmus with acetic acid. To this solution are added 5.4 parts of m-phenylenediamine dissolved in 108 parts of water made acid to litmus.

Phosgene is passed into the solution, preferably containing sodium acetate, until a test-sample can no longer be diazotised. The reaction of the solution is maintained just acid to litmus during the addition of phosgene by gradually adding dilute sodium carbonate solution. The condensation product is precipitated with common salt and filtered off.

After the p-toluene sulphonic acid ester has been saponified in the way described in previous examples a dyestuff is obtained which dyes cellulose fibres in clear red shades, somewhat more yellowish than those given by the dyestuffs of Examples 2 and 3.

Example 5

62.1 parts of the monoazo dyestuff from the diazotised p-toluene-sulphonic acid ester of 1-amino-8-hydroxynaphthalene-3:6-disulphonic acid and 1-amino-3-methyl-6-methoxy benzene are dissolved together with 30.4 parts of 4:4'-di-(p-aminobenzoyl)-diaminostilbene-2:2'-disulphonic acid in about 2800 parts of water by adding sodium carbonate.

Phosgene is passed into the solution, preferably weakly alkaline, as described in previous examples and after separating the condensation product the p-toluene sulphonic acid group is split off. The dyestuff obtained dyes cellulose fibres in red shades which are fast to light.

Example 6

62.1 parts of the monoazo dyestuff prepared by diazotising the p-toluenesulphonic acid ester of 1-amino-8-hydroxy naphthalene-4:6-disulphonic acid, and coupling the diazo compound with 1-amino-3-methyl-6-methoxybenzene are dissolved together with 18.5 parts of 4:4'-diaminostilbene-2:2'-disulphonic acid in about 800 parts of water by adding sodium carbonate. This solution is treated with phosgene under the conditions described in Example 1 until no more primary amine can be detected in a test-sample. The condensation product is then precipitated with common salt and filtered off. Next, the p-toluene-sulphonic acid group is split off by heating in dilute caustic alkali solution at 80–90°. The saponified dyestuff partly crystallizes out on cooling; precipitation is completed by adding common salt and the product filtered off.

The new dyestuff gives red dyeings on cellulose fibres which are more bluish than those given by the dyestuffs described in Examples 1–5.

Example 7

60.7 parts of the monoazo dyestuff from the diazotised benzenesulphonic acid ester of 1:8-amino-hydroxynaphthalene-3:6-disulphonic acid and 1-amino-3-methyl-6-methoxybenzene, are dissolved together with 11.9 parts of 2:6-diaminonaphthalene-8-sulphonic acid, in about 740 parts of water by adding sodium carbonate.

This solution is treated with phosgene under the conditions described in Example 1 until no more primary amine can be detected in a test-sample. The condensation product formed is precipitated by adding common salt and filtered off. The benzenesulphonic acid groups are split off by warming in dilute caustic alkaline solution at 80–90°. The saponified dyestuff partly crystallises out on cooling; it is completely precipitated with common salt and filtered off.

The new dystuff dyes cellulose fibres in yellowish-red shades which have good light-fastness properties.

Example 8

Exactly the same procedure as in Example 7 can be employed with 60.7 parts of the monoazo dystuff named therein or 62.1 parts of the corresponding monoazo dystuff prepared from the p-toluene-sulphonic acid ester of 1:8-aminonaphthol-3:6-disulfonic acid and 25.1 parts of 6:6'-diamino-2:2'-dinaphthylurea-8:8-disulphonic acid (A). The action of phosgene on these components dissolved in about 870 parts of water, followed by splitting off the p-toluene-sulphonic acid group yields a new dystuff which also dyes cellulose fibres in somewhat yellowish red shades possessing good fastness to light.

Compound A is prepared by the action of phosgene on 6-nitro-2-aminonaphthalene-8-sulphonic acid, followed by reduction of the nitro compound obtained by Béchamps method.

Example 9

62.1 parts of the monoazo dystuff from the diazotised p-toluene-sulphonic acid ester of 1:8-amino - hydroxy - naphthalene - 3:6-disulphonic acid and 1-amino-3-methyl-6-methoxybenzene are dissolved with sodium carbonate in about 1200 parts of water and made weakly acid to litmus with acetic acid. To this solution are added 7.9 parts of 1:5-naphthylenediamine dissolved in 158 parts of water made acid to litmus.

The reaction mixture (which should be acid to litmus) is then submitted to the action of phosgene, advantageously in the presence of sodium acetate, until no more primary amine can be detected in a test sample. The condensation product formed is precipitated out with common salt and filtered off. After splitting off the p-toluene-sulphonic acid groups by heating in dilute caustic alkali solution at 80–90° a new dyestuff is obtained which dyes cellulose fibres in red shades which have good light-fastness properties.

In the following table are collected together a few further dyestuffs preparable according to the invention by condensing an aminoazo dyestuff and a diamine with phosgene, followed by the splitting off of the acyl group. The method of manufacture is exactly analogous to that given in the preceding examples.

| No. | Aminoazo Dyestuff | Diamine | Dyeing on Cellulose Fibres |
|---|---|---|---|
| 1 | p-Toluene-sulphonic acid ester of 1-amino-8-hydroxynaphthalene-3:6-disulphonic acid → 1-amino-3-methyl-6-methoxybenzene. | 4-Amino-4'-(p-aminobenzoyl)-aminostilbene-2:2'-disulphonic acid. | red. |
| 2 | ___do___ | 4-Amino-4'-(m-aminobenzoyl)-aminostilbene-2:2'-disulphonic acid. | Do. |
| 3 | ___do___ | p-Phenylenediamine sulphonic acid | Do. |
| 4 | ___do___ | m-Phenylenediamine sulphonic acid | Do. |
| 5 | ___do___ | Benzidine-2:2'-disulphonic acid | Do. |
| 6 | ___do___ | Benzidine-3:3'-disulphonic acid | Do. |
| 7 | ___do___ | 4:4'-Diamino-diphenyl-urea-3:3'-disulphonic acid | Do. |
| 8 | ___do___ | 4'-Aminobenzoyl-p-phenylene-diamine sulphonic acid. | Do. |
| 9 | ___do___ | 1-Methyl-2:6-diamino-benzene-4-sulphonic acid | Do. |
| 10 | ___do___ | 4:4'-Diamino-diphenyl-sulphide-2:2'-disulphonic acid. | Do. |
| 11 | ___do___ | 4:4'-Diamino-diphenylamine-2-sulphonic acid | Do. |
| 12 | ___do___ | Benzidine-3:3'-dicarboxylic acid | Do. |
| 13 | ___do___ | p-Phenylene diamine | Do. |
| 14 | ___do___ | 4'-Aminobenzoyl-p-phenylene diamine | Do. |
| 15 | ___do___ | Benzidine | Do. |
| 16 | ___do___ | o-Dianisidine | Do. |
| 17 | ___do___ | o-Tolidine | Do. |
| 18 | ___do___ | 4:4'-Diamino-diphenyl-methane | Do. |
| 19 | ___do___ | 4:4'-Diamino-diphenyl-sulphide | Do. |
| 20 | p-Toluene-sulphonic acid ester of 1-amino-8-hydroxynaphthalene-4:6-disulphonic acid → 1-amino-3-methyl-6-methoxybenzene. | 4:4'-Di-(p-aminobenzoyl)-diaminostilbene-2:2'-disulphonic acid. | blueish red. |
| 21 | ___do___ | 4-Amino-4'-(p-aminobenzoyl)-aminostilbene-2:2'-disulphonic acid. | Do. |
| 22 | ___do___ | 4-Amino-4'-(m-aminobenzoyl)-aminostilbene-2:2'-disulphonic acid. | Do. |
| 23 | ___do___ | p-Phenylenediamine-sulphonic acid | Do. |
| 24 | ___do___ | 4'-Aminobenzoyl-p-phenylenediamine sulphonic acid. | Do. |
| 25 | ___do___ | m-Phenylene diamine | Do. |
| 26 | ___do___ | p-Phenylene diamine | Do. |
| 27 | ___do___ | Benzidine | Do. |
| 28 | p-Toluene-sulphonic acid ester of 1-amino-8-hydroxynaphthalene-3:6-disulphonic acid → 1-amino-3-methyl-6-methoxybenzene. | 2:7-naphthylene diamine | slightly yellowish red. |
| 29 | Benzene-sulphonic acid ester of 1-amino-8-hydroxynaphthalene-3:6-disulphonic acid → 1-amino-3-methyl-6-methoxybenzene. | 1:5-di-p-amino-benzoyl-naphthylene-diamine-3:7-disulphonic acid. | Do. |
| 30 | Benzene-sulphonic acid ester of 1-amino-8-hydroxynaphthalene-3:6-disulphonic acid → 1-amino-3-methyl-6-ethoxybenzene. | Benzidine-3-sulphonic acid | red. |
| 31 | ___do___ | m-Phenylene diamine | Do. |

What we claim is:
1. An azo dyestuff of the formula

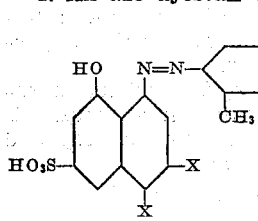

wherein one X and the corresponding $X_1$ represents H and the other X and the corresponding other $X_1$ represents $SO_3H$, Y represents a radical wherein Y represents a radical of an aromatic diamine whose amino groups are in another than

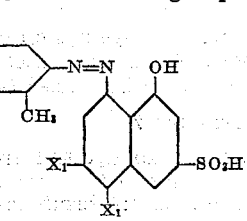

the o-position relative to each other and which are free from azo-chromophores.

3. An azo dyestuff of the formula

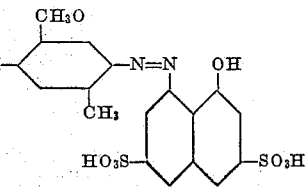

of an aromatic diamine whose amino groups are

4. An azo dyestuff of the formula

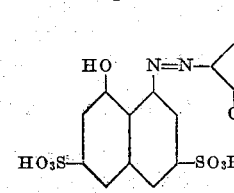

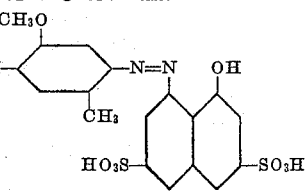

in another than the o-position relative to each

5. An azo dyestuff of the formula

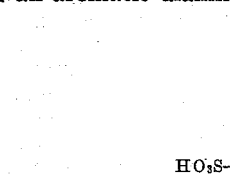

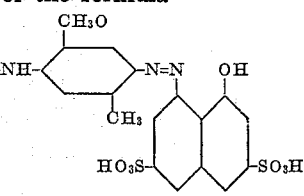

other and which are free from azo-chromophores

6. An azo dyestuff of the formula

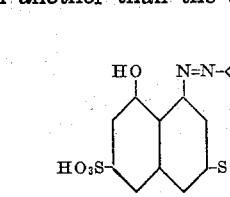

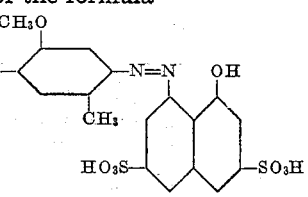

and R represents a lower alkyl group.

7. An azo dyestuff of the formula

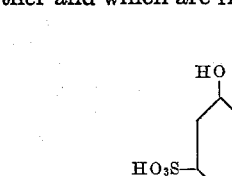

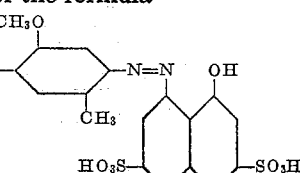

2. An azo dyestuff of the formula

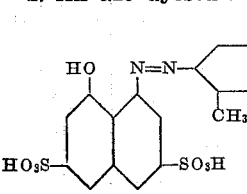

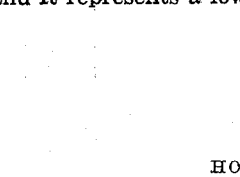

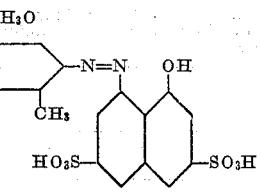

ERNST KELLER.
FRITZ PROBST.

REFERENCES CITED

The following references are of record in the file of this patent:

UNITED STATES PATENTS

| Number | Name | Date |
|---|---|---|
| 1,006,929 | Freimann | Oct. 24, 1911 |
| 2,846,546 | Montmollin et al. | Feb. 23, 1932 |
| 2,368,844 | Keller et al. | Feb. 6, 1945 |
| 2,399,066 | Schmid et al. | Apr. 23, 1946 |